US009123523B2

(12) United States Patent
Green et al.

(10) Patent No.: US 9,123,523 B2
(45) Date of Patent: Sep. 1, 2015

(54) EXCITATION OF REAGENT MOLECULES WITHN A RF CONFINED ION GUIDE OR ION TRAP TO PERFORM ION MOLECULE, ION RADICAL OR ION-ION INTERACTION EXPERIMENTS

(71) Applicant: Micromass UK Limited, Wilmslow (GB)

(72) Inventors: Martin Raymond Green, Bowden (GB); Jeffery Mark Brown, Hyde (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 14/401,300

(22) PCT Filed: May 16, 2013

(86) PCT No.: PCT/GB2013/051264

§ 371 (c)(1),
(2) Date: Nov. 14, 2014

(87) PCT Pub. No.: WO2013/171495

PCT Pub. Date: Nov. 21, 2013

(65) Prior Publication Data

US 2015/0097114 A1 Apr. 9, 2015

Related U.S. Application Data

(60) Provisional application No. 61/651,225, filed on May 24, 2012.

(30) Foreign Application Priority Data

May 18, 2012 (GB) .................................. 1208733.4

(51) Int. Cl.
*H01J 49/10* (2006.01)
*H01J 27/24* (2006.01)
(Continued)

(52) U.S. Cl.
CPC ........... *H01J 49/422* (2013.01); *H01J 49/0059* (2013.01); *H01J 49/10* (2013.01); *H01J 49/145* (2013.01); *H01J 49/162* (2013.01); *H01J 49/24* (2013.01)

(58) Field of Classification Search
CPC .............. H01J 49/0031; H01J 49/0072; H01J 49/0059; H01J 49/10; H01J 49/162; H01J 49/02; H01J 49/0422; H01J 49/14; H01J 49/164; H01J 49/24; H01J 27/24; G01N 27/64
USPC ........... 250/281, 282, 288, 423 R, 423 P, 424, 250/222.2, 425; 315/111.21, 111.81
See application file for complete search history.

(56) References Cited

U.S. PATENT DOCUMENTS 5,396,064 A 3/1995 Wells
6,124,592 A * 9/2000 Spangler ....................... 250/287
(Continued)

FOREIGN PATENT DOCUMENTS

JP 2008282595 11/2008

OTHER PUBLICATIONS

McLuckey et al., "*Ion/Ion Reactions: New Chemistry for Analytical MS*", Anal. Chem., vol. 81, pp. 8669-8676, 2009.
(Continued)

*Primary Examiner* — David A Vanore
(74) *Attorney, Agent, or Firm* — Diederiks & Whitelaw, PLC

(57) ABSTRACT

A mass spectrometer is disclosed comprising an RF ion guide or ion trap and a device arranged and adapted to supply a reagent gas within the RF ion guide or ion trap. The mass spectrometer further comprises a photo-ionization device and a control system arranged and adapted: (i) to cause first ions to fragment or dissociate within the RF ion guide or ion trap to form second ions and neutral molecules; and (ii) to cause the photo-ionization device to photo-ionize and/or photo-excite the reagent gas to form reagent ions, excited species or radical species. The reagent ions, excited species or radical species interact with at least some of the neutral molecules located within the RF ion guide or ion trap to form analyte ions.

33 Claims, 1 Drawing Sheet

(51) Int. Cl.

| | |
|---|---|
| ***G01N 27/64*** | (2006.01) |
| ***H01J 49/42*** | (2006.01) |
| ***H01J 49/00*** | (2006.01) |
| ***H01J 49/16*** | (2006.01) |
| ***H01J 49/14*** | (2006.01) |
| ***H01J 49/24*** | (2006.01) |

(56) References Cited

U.S. PATENT DOCUMENTS

| | | | | |
|---|---|---|---|---|
| 6,646,256 | B2 * | 11/2003 | Gourley et al. | 250/288 |
| 6,781,117 | B1 | 8/2004 | Willoughby et al. | |
| 6,919,562 | B1 * | 7/2005 | Whitehouse et al. | 250/288 |
| 7,095,019 | B1 * | 8/2006 | Sheehan et al. | 250/288 |
| 7,253,406 | B1 * | 8/2007 | Sheehan et al. | 250/288 |
| 7,329,353 | B2 * | 2/2008 | Dillon et al. | 210/635 |
| 7,528,365 | B2 * | 5/2009 | Guo et al. | 250/282 |
| 7,642,511 | B2 * | 1/2010 | Reilly | 250/292 |
| 7,723,676 | B2 * | 5/2010 | Vilkov et al. | 250/281 |
| 8,143,572 | B2 | 3/2012 | Scigocki | |
| 8,563,921 | B2 | 10/2013 | Brown et al. | |
| 8,598,514 | B2 | 12/2013 | Robb | |
| 8,723,110 | B2 * | 5/2014 | Whitehouse et al. | 250/288 |
| 8,742,363 | B2 * | 6/2014 | Munchmeyer et al. | 250/423 P |
| 8,809,771 | B2 * | 8/2014 | Syrstad | 250/282 |
| 2005/0242280 | A1 * | 11/2005 | Nikolaev | 250/291 |
| 2007/0262252 | A1 * | 11/2007 | Dowell | 250/282 |
| 2010/0301204 | A1 * | 12/2010 | Koster et al. | 250/283 |
| 2011/0121173 | A1 * | 5/2011 | Koenig et al. | 250/282 |
| 2011/0303839 | A1 * | 12/2011 | Robb | 250/282 |
| 2014/0175276 | A1 * | 6/2014 | Giuliani et al. | 250/282 |
| 2015/0008313 | A1 * | 1/2015 | Loboda et al. | 250/282 |
| 2015/0060657 | A1 * | 3/2015 | Brown et al. | 250/282 |
| 2015/0090875 | A1 * | 4/2015 | Brown et al. | 250/282 |
| 2015/0097114 | A1 * | 4/2015 | Green et al. | 250/282 |

OTHER PUBLICATIONS

Polce et al., "*Characterization of Neutral Fragments in Tandem Mass Spectrometry: A Unique Route to Mechanistic and Structural Information*", Journal of Mass Spectrometry, vol. 31, pp. 1073-1085, 1996.

Robb et al., "*A New Ion Source and Procedures for Atmospheric Pressure-Electron Capture Dissociation of Peptides*", J. Am. Soc. Mass. Spectrom., vol. 22, pp. 1699-1706, 2011.

Robb et al., "*Atmospheric Pressure Photoionization: An Ionization Method for Liquid Chromatography-Mass Spectrometry*", Analytical Chemistry, vol. 72, pp. 3653-3659, 2000.

* cited by examiner

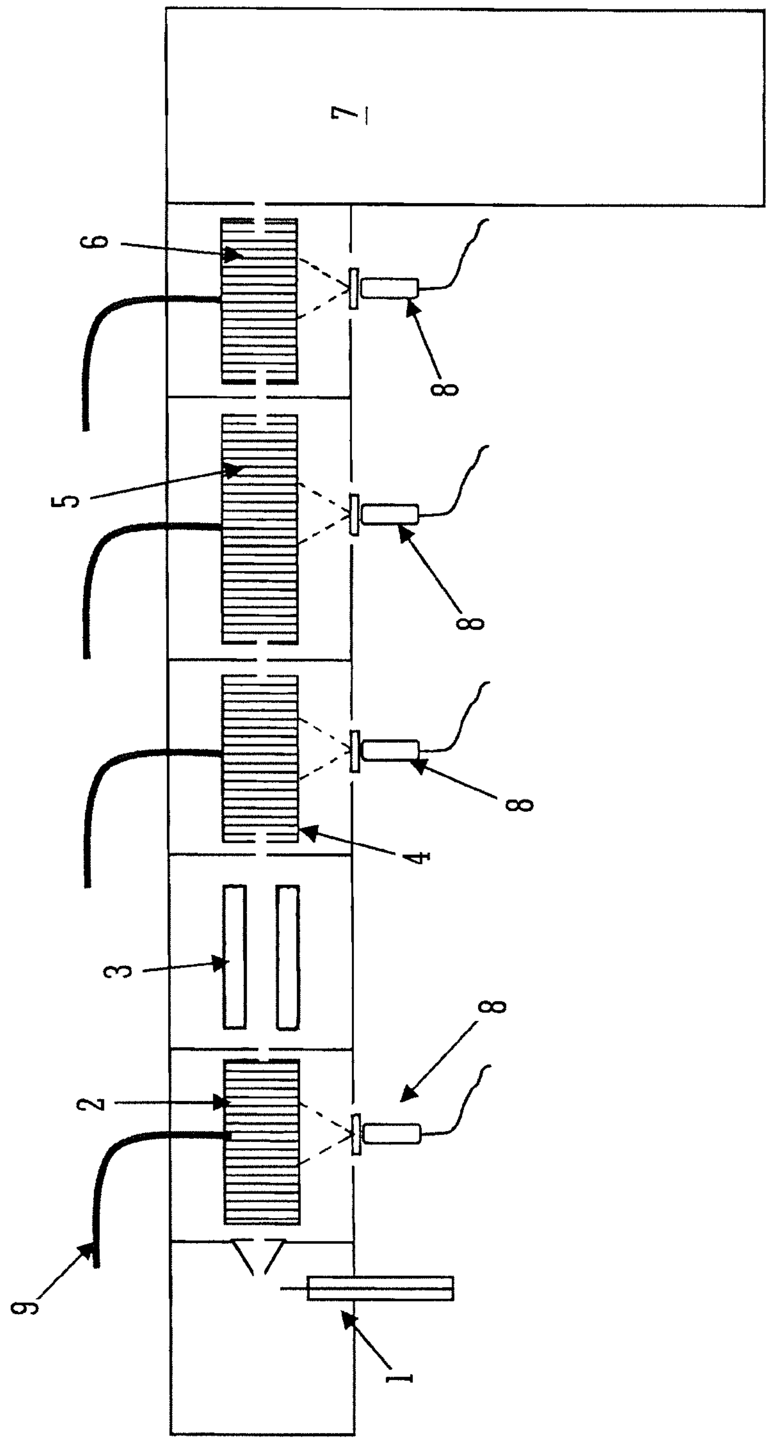
7
6
5
8
8
8
4
3
8
2
9
1

EXCITATION OF REAGENT MOLECULES WITHN A RF CONFINED ION GUIDE OR ION TRAP TO PERFORM ION MOLECULE, ION RADICAL OR ION-ION INTERACTION EXPERIMENTS

CROSS-REFERENCE TO RELATED APPLICATION

This application is the National Stage of International Application No. PCT/GB2013/051264 filed on 16 May 2013, which claims priority from and the benefit of U.S. Provisional Patent Application Ser. No. 61/651,225 filed on 24 May 2012 and United Kingdom Patent Application No. 1208733.4 filed on 18 May 2012. The entire contents of these applications are incorporated herein by reference.

BACKGROUND OF THE PRESENT INVENTION

The present invention relates to a mass spectrometer and a method of mass spectrometry.

Atmospheric Pressure Photo Ionisation ("APPI") is a known ionisation technique and is disclosed, for example, in D. B. Robb, T. R. Covey, A. P. Bruins, "Atmospheric Pressure Photoionization: An Ionization Method for Liquid Chromatography-Mass Spectrometry" Anal. Chem. (2000), 72, 3653-3659.

In APPI photons are absorbed by species at atmospheric pressure which have ionization energies or an ionisation potential below the ionisation energy of the photons. For example, a carrier or reagent gas such as nitrogen will strongly absorb vacuum ultra-violet ("VUV") radiation or UV photons forming an excited metastable species which can then interact with analyte molecules to ionize the analyte molecules:

$$N_2+h\nu \rightarrow N_2^* \quad (1)$$

$$N_2^*M \rightarrow N_2+M^{+\cdot}+e^- \quad (2)$$

Dopant molecules (e.g. toluene and benzene) may also be added in order to increase the ionization efficiency. The dopant molecules readily ionize by photo-ionization and then transfer charge to the analyte molecules. The reagent and dopant ions react with analyte molecules by charge exchange or proton transfer to produce analyte ions.

More recently atmospheric pressure Electron Capture Dissociation ("ECD") has been demonstrated by creating photo-electrons from excitation of acetone dopant in an APPI source. Reference is made, for example, to D. B. Robb, J. C. Rogalski, J. Kast, M. W. Blades, "A New Ion Source and Procedures for Atmospheric Pressure-Electron Capture Dissociation of Peptides" J. Am. Soc. Mass Spectrom. (2011), 22, 1699-1706.

In a known arrangement ion-ion reactions or ion-radical reactions such as Electron Transfer Dissociation ("ETD") are performed within an RF ion guide or ion trap and are achieved by producing reagent ions remotely from the ion guide or reaction chamber.

In conventional mass spectrometers reagent ions are generally produced remotely with respect to an RF ion guide and the reagent ions are transferred to the reaction region of the mass spectrometer prior to introduction of analyte ions.

A review of ion-ion reactions was made by S. A. McLuckey and T.-Y. Huang, "Ion/Ion Reactions: New Chemistry for Analytical MS", Anal. Chem. (2009), 81, 8669-8676.

FIG. 7 of WO 2008/142170 (Scigocki) discloses an arrangement wherein primary ions $M^+$ crossing a central region of a multipolar waveguide are dissociated by Collision Induced Dissociation with background gas so as to form fragment ions $m^+$ and neutral particles m'. The dissociated neutral particles m' are then directly ionised by laser light from a laser.

U.S. Pat. No. 6,919,562 (Whitehouse) discloses a method of Electron Capture Dissociation ("ECD") wherein analyte ions are fragmented by interacting analyte ions with low energy electrons.

FIG. 5A of U.S. Pat. No. 6,781,117 (Willoughby) discloses an arrangement wherein a DC collision cell is provided. Reagent gas is ionised by electrons generated from a discharge source. Neutral fragment products are then subsequently ionised by the reagent ions.

It is desired to provide an improved mass spectrometer and method of mass spectrometry.

SUMMARY OF THE PRESENT INVENTION

According to an aspect of the present invention there is provided a mass spectrometer comprising:

an RF ion guide or ion trap;

a device arranged and adapted to supply a reagent gas within the RF ion guide or ion trap;

a photo-ionisation device; and a control system arranged and adapted:

(i) to cause first ions to fragment or dissociate within the RF ion guide or ion trap to form second ions and neutral molecules; and (ii) to cause the photo-ionisation device to photo-ionise and/or photo-excite the reagent gas to form reagent ions, excited species or radical species, wherein the reagent ions, excited species or radical species interact with at least some of the neutral molecules located within the RF ion guide or ion trap to form analyte ions.

The phrase "reagent ions, excited species or radical species" should not be construed as including electrons or photo-electrons. A person skilled in the art will appreciate that electrons or photo-electrons are neither ions, excited species nor radical species. According to a preferred embodiment the reagent ions, excited species or radical species which are formed according to the present invention and which interact with neutral molecules or analyte ions have an atomic mass ≥1 (c.f. electrons which have an atomic mass of 0.00055).

Various aspects of the present invention relate to ion-ion, ion-molecule or ion-excited neutral reactions. Ionisation of neutral molecules with free electrons as produced, for example, from a discharge source is not intended to fall within the scope of the present invention.

The arrangement shown in FIG. 7 of WO 2008/142170 relates to an arrangement wherein neutral fragments are ionised directly by directing photons from a laser onto the neutral fragments. This is in contrast to the present invention wherein the photo-ionisation device (preferably a UV lamp) ionises a reagent gas to form reagent ions within the RF ion guide or ion trap and wherein it is reagent ions (rather than photons) which interact with the neutral molecules in order to ionise the neutral molecules.

The present invention is particularly advantageous in that a high concentration of reagent ions, excited species or radical species can be created or formed. As a result, there is a high probability of the reagent ions, excited species or radical species interacting with the neutral molecules. In contrast, there is typically a small cross-section or small probability of an interaction between a laser beam and a population of neutral molecules.

The arrangement disclosed in U.S. Pat. No. 6,781,117 relates to ionising a reagent gas with electrons. There is no disclosure of photo-ionising a reagent gas to form reagent ions, excited species or radical species and as explained above, ionising a reagent gas with electrons falls outside of the scope of the present invention.

According to the present invention ions are confined within an RF ion guide or ion trap. The RF ion guide or ion trap is particularly advantageous in that one or more transient DC potentials or other potentials may be applied to electrodes forming the RF ion guide or ion trap in order to control the residence time of the first ions and/or the second ions and/or the reagent ions and/or the analyte ions within the RF ion guide or ion trap. This is not possible with conventional DC ion traps.

FIG. 5A of U.S. Pat. No. 6,781,117 discloses an arrangement wherein a DC collision cell is provided. Reagent gas is ionised by electrons generated from a discharge source. Neutral fragment products are subsequently ionised by the reagent ions. In contrast, according to the present invention a RF ion guide or ion trap (rather than a DC collision cell) is provided and reagent ions are generated by photo-ionising reagent gas using photons from a photo-ionisation device (e.g. UV lamp) rather than electrons from a discharge source.

The excited species preferably comprise excited neutral atoms, excited neutral molecules, excited metastable atoms or excited metastable molecules.

The reagent ions, excited species or radical species preferably interact with at least some of the neutral molecules such that either: (i) energy, protons or electrons are transferred or exchanged between the reagent ions, excited species or radical species and the neutral molecules so as to form the analyte ions; and/or (ii) energy, protons or electrons are captured by and/or released from the reagent ions, excited species or radical species and/or the neutral molecules so as to form the analyte ions.

According to an aspect of the present invention there is provided a mass spectrometer comprising:

an RF ion guide or ion trap;

a device arranged and adapted to supply a reagent gas within the RF ion guide or ion trap;

a photo-ionisation device; and a control system arranged and adapted to cause the photo-ionisation device to photo-ionise and/or photo-excite the reagent gas to form reagent ions, excited species or radical species, wherein the reagent ions, excited species or radical species interact with analyte ions within the RF ion guide or ion trap in order either: (i) to cause the analyte ions to fragment and/or dissociate; and/or (ii) to reduce or change the charge state of the analyte ions.

U.S. Pat. No. 6,919,562 discloses a method of Electron Capture Dissociation ("ECD") wherein analyte ions are fragmented by interacting the analyte ions with low energy electrons. In contrast, according to the present invention analyte ions are fragmented by interacting the analyte ions with reagent ions rather than low energy electrons. U.S. Pat. No. 6,919,562 does not disclose reducing the charge state of the analyte ions. Interactions between analyte ions and free electrons is not intended to fall within the scope of the present invention.

Various aspects of the present invention relate to ion-ion, ion-molecule or ion-excited neutral reactions. Interaction of analyte ions with free electrons as produced, for example, from a discharge source is not intended to fall within the scope of the present invention.

The excited species preferably comprise excited neutral atoms, excited neutral molecules, excited metastable atoms or excited metastable molecules.

One advantage of using excited species such as metastable atoms is that they are able to fragment singly charged analyte ions which is not possible by Electron Capture Dissociation ("ECD") or Electron Transfer Dissociation ("ETD") which both require multiply charged (normally positive) ions.

The reagent ions, excited species or radical species preferably interact with the analyte ions such that either: (i) energy, protons or electrons are transferred or exchanged between the reagent ions, excited species or radical species and the analyte ions; and/or (ii) energy, protons or electrons are captured by and/or released from the reagent ions, excited species or radical species and/or the analyte ions.

According to an embodiment the analyte ions are caused to fragment by Electron Transfer Dissociation ("ETD").

According to an embodiment the reagent gas may comprise oxygen and wherein the reagent ions comprise ozone which interacts with analyte ions to cause ozone induced dissociation or ozonolysis of the analyte ions.

According to an embodiment the analyte ions are reduced in charge state by Proton Transfer Reaction ("PTR").

The RF ion guide or ion trap preferably comprises a plurality of electrodes and wherein the mass spectrometer further comprises an AC or RF voltage device arranged and adapted to apply an AC or RF voltage to the plurality of electrodes in order to generate a pseudo-potential which acts to confine ions radially and/or axially within the RF ion guide or ion trap.

The photo-ionisation device preferably comprises an electromagnetic radiation source arranged and adapted to emit photons, wherein the photons are caused to interact, in use, with the reagent gas within the RF ion guide or ion trap in order to photo-ionise and/or photo-excite the reagent gas.

The photo-ionisation source is preferably arranged adjacent the RF ion guide or ion trap.

The photo-ionisation source preferably comprises an ultra-violet radiation source.

The ultra-violet radiation source is preferably arranged and adapted to emit photons having a wavelength in the range 10-400 nm.

The ultra-violet radiation source is preferably arranged and adapted to emit photons having an energy ≥3 eV.

The photo-ionisation source may comprises an infra-red radiation source.

The infra-red radiation source is preferably arranged and adapted to emit photons having a wavelength in the range 750 nm-1 mm.

The infra-red radiation source is preferably arranged and adapted to emit photons having an energy ≤1.7 eV.

According to the preferred embodiment the photo-ionisation source comprises a lamp.

The photo-ionisation source preferably comprises an incoherent source of radiation.

The photo-ionisation source according to the preferred embodiment preferably emits a broad range of frequencies. As a result, a wide variety of reagent gases may be photo-ionised and/or photo-excited by the preferred photo-ionisation source which preferably comprises a lamp. This is in contrast to known laser photo-ionisation sources wherein a laser is chosen on the basis of emitting photons at a frequency which is optimal to recite a specific reagent or bond. Tunable lasers are known but these are expensive.

The reagent gas preferably comprises nitrogen gas.

The reagent gas preferably causes collisional cooling of ions within the RF ion guide or ion trap.

The control system is preferably further arranged and adapted to control the residence time of the reagent ions, excited species or radical species and/or analyte ions within the RF ion guide or ion trap.

The RF ion guide or ion trap is preferably maintained at sub-atmospheric pressure.

The RF ion guide or ion trap is preferably maintained in use at a pressure selected from the group consisting of: (i) $<1.0\times10^{-7}$ mbar; (ii) $1.0\times10^{-7}$-$1.0\times10^{-6}$ mbar; (iii) $1.0\times10^{-6}$-$1.0\times10^{-5}$ mbar; (iv) $1.0\times10^{-5}$-$1.0\times10^{-4}$ mbar; (v) $1.0\times10^{-4}$-$1.0\times10^{-3}$ mbar; (vi) 0.001-0.01 mbar; (vii) 0.01-0.1 mbar; (viii) 0.1-1 mbar; (ix) 1-10 mbar; (x) 10-100 mbar; and (xi) 100-800 mbar.

The RF ion guide or ion trap is preferably located within a vacuum chamber of the mass spectrometer.

The RF ion guide preferably comprises: (i) an ion tunnel or ion funnel ion guide comprising a plurality of electrodes each having one or more apertures through which ions are transmitted in use; (ii) a plurality of planar electrodes defining an ion guiding region through which ions are transmitted in use; (iii) a multipole rod set ion guide; (iv) an axially segmented multipole rod set ion guide; or (v) a plurality of planar electrodes arranged generally in the plane of ion travel.

The mass spectrometer preferably further comprises a device for applying one or more transient DC potentials or other potentials to electrodes forming the RF ion guide or ion trap in order to control the residence time of the first ions and/or the second ions and/or the reagent ions and/or the analyte ions and/or first ions and/or second ions within the RF ion guide or ion trap. This is particularly advantageous compared to conventional arrangements comprising a DC collision cell wherein the residence time of ions can not be controlled.

The mass spectrometer preferably further comprises an ion source and wherein the RF ion guide or ion trap is arranged downstream of the ion source in a vacuum chamber of the mass spectrometer.

The ion source is preferably selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source.

The vacuum chamber is preferably maintained in use at a pressure selected from the group consisting of: (i) $<1.0\times10^{-7}$ mbar; (ii) $1.0\times10^{-7}$-$1.0\times10^{-6}$ mbar; (iii) $1.0\times10^{-6}$-$1.0\times10^{-5}$ mbar; (iv) $1.0\times10^{-5}$-$1.0\times10^{-4}$ mbar; (v) $1.0\times10^{-4}$-$1.0\times10^{-3}$ mbar; (vi) 0.001-0.01 mbar; (vii) 0.01-0.1 mbar; (viii) 0.1-1 mbar; (ix) 1-10 mbar; (x) 10-100 mbar; and (xi) 100-800 mbar.

According to an aspect of the present invention there is provided a method of mass spectrometry comprising:

providing an RF ion guide or ion trap;

supplying a reagent gas within the RF ion guide or ion trap;

causing first ions to fragment or dissociate within the RF ion guide or ion trap to form second ions and neutral molecules; and photo-ionising and/or photo-exciting the reagent gas to form reagent ions, excited species or radical species, wherein the reagent ions, excited species or radical species interact with at least some of the neutral molecules located within the RF ion guide or ion trap to form analyte ions.

According to an aspect of the present invention there is provided a method of mass spectrometry comprising:

providing an RF ion guide or ion trap;

supplying a reagent gas within the RF ion guide or ion trap; and photo-ionising and/or photo-exciting the reagent gas to form reagent ions, excited species or radical species, wherein the reagent ions, excited species or radical species interact with analyte ions within the RF ion guide or ion trap in order either: (i) to cause the analyte ions to fragment and/or dissociate; and/or (ii) to reduce or change the charge state of the analyte ions.

According to the preferred embodiment the photo-ionisation device preferably comprises a UV lamp (i.e. an incoherent source of radiation) rather than a laser (i.e. a coherent source of radiation). A UV lamp as used according to a preferred embodiment advantageously emits UV photons with a wide range of wavelengths so that the reagent gas may be photo-ionised or photo-excited in an optimal manner and so that a wide variety of reagent molecules may be photo-ionised or photo-excited. The use of a UV lamp avoids the need to provide focusing optics as is the case with a laser and the UV lamp can also irradiate a larger cross-section of the reagent gas within the RF ion guide or ion trap without the need to provide optical lenses (as would be the case with a laser).

The method of photo-ionisation according to the preferred embodiment using a UV lamp is therefore advantageous compared with conventional arrangements which use a laser as a photo-ionisation source.

According to an aspect of the present invention there is provided a mass spectrometer comprising:

an ion guide or ion trap;

a photo-ionisation device; and a control system arranged and adapted:

(i) to cause first ions to fragment or dissociate to form second ions and neutral molecules; and (ii) to cause the photo-ionisation device to photo-ionise at least some of the neutral molecules located within the ion guide or ion trap, the neutral molecules having been formed as a result of fragmenting or dissociating the first ions.

The mass spectrometer preferably further comprises a device arranged and adapted to supply to a reagent and/or a dopant within the ion guide or ion trap.

The reagent and/or dopant is preferably photo-ionised and/or excited to form reagent and/or dopant ions and/or an excited species and/or a radical species and/or photoelectrons, wherein the reagent and/or dopant ions and/or the excited species and/or the radical species and/or the photoelectrons interact with the neutral molecules to form analyte ions.

According to an aspect of the present invention there is provided a mass spectrometer comprising:

an ion guide or ion trap;

a photo-ionisation device; and a control system arranged and adapted:

(i) to cause the photo-ionisation device to photo-ionise at least some reagent and/or dopant located within the ion guide or ion trap to form reagent and/or dopant ions and/or an excited species and/or a radical species and/or photoelectrons; and (ii) to cause the reagent and/or dopant ions and/or the excited species and/or the radical species and/or the photoelectrons to interact with analyte ions within the ion guide or ion trap in order to reduce or change the charge state of the analyte ions.

According to an aspect of the present invention there is provided a mass spectrometer comprising:

an ion guide or ion trap;

a photo-ionisation device; and a control system arranged and adapted:

(i) to cause the photo-ionisation device to photo-ionise at least some reagent and/or dopant located within the ion guide or ion trap to form reagent and/or dopant ions and/or an excited species and/or a radical species; and (ii) to cause the reagent and/or dopant ions and/or the excited species and/or the radical species to interact with analyte ions within the ion guide or ion trap in order to cause the analyte ions to fragment and/or dissociate.

The analyte ions are preferably caused to fragment by Electron Transfer Dissociation ("ETD").

According to an embodiment the reagent comprises oxygen and wherein the reagent ions comprise ozone which interacts with analyte ions to cause ozone induced dissociation or ozonolysis of the analyte ions.

The mass spectrometer preferably further comprises a device arranged and adapted to add one or more dopants into the ion guide or ion trap, wherein the dopant is ionised by photo-ionisation to form dopant ions and wherein the dopant ions transfer charge to molecules and/or ions and/or reagent within the ion guide or ion trap.

The dopant preferably comprises a volatile organic. According to an embodiment the dopant comprises toluene, benzene or acetone.

The ion guide or ion trap preferably comprises an RF ion guide or ion trap.

The ion guide or ion trap is preferably arranged to confine ions radially and/or axially within the ion guide or ion trap.

The photo-ionisation device preferably comprises an electromagnetic radiation source arranged and adapted to emit photons, wherein the photons are caused to interact, in use, with a reagent and/or dopant present within the ion guide or ion trap in order to excite and/or ionise the reagent and/or dopant.

The photo-ionisation source is preferably arranged adjacent the ion guide or ion trap.

The photo-ionisation source preferably comprises an ultra-violet radiation source.

The ultra-violet radiation source is preferably arranged and adapted to emit photons having a wavelength in the range 10-400 nm.

The ultra-violet radiation source is preferably arranged and adapted to emit photons having an energy ≥3 eV.

According to a less preferred embodiment the photo-ionisation source may comprise an infra-red radiation source.

The infra-red radiation source is preferably arranged and adapted to emit photons having a wavelength in the range 750 nm-1 mm.

The infra-red radiation source is preferably arranged and adapted to emit photons having an energy ≤1.7 eV.

The reagent preferably comprises nitrogen or other gas.

The reagent preferably causes collisional cooling of ions within the ion guide or ion trap.

The control system is preferably further arranged and adapted to control the residence time of reagent and/or dopant ions and/or analyte ions within the ion guide or ion trap.

The ion guide or ion trap is preferably maintained at sub-atmospheric pressure.

The ion guide or ion trap is preferably located within a vacuum chamber of the mass spectrometer.

According to an aspect of the present invention there is provided a method of mass spectrometry comprising:

causing first ions to fragment or dissociate to form second ions and neutral molecules; and photo-ionising at least some of the neutral molecules located within an ion guide or ion trap, the neutral molecules having been formed as a result of fragmenting or dissociating the first ions.

According to an aspect of the present invention there is provided a method of mass spectrometry comprising:

photo-ionising at least some reagent and/or dopant located within an ion guide or ion trap to form reagent and/or dopant ions and/or an excited species and/or a radical species and/or photoelectrons; and causing the reagent and/or dopant ions and/or the excited species and/or the radical species and/or the photoelectrons to interact with analyte ions within the ion guide or ion trap in order to reduce or change the charge state of the analyte ions.

According to an aspect of the present invention there is provided a method of mass spectrometry comprising:

photo-ionising at least some reagent and/or dopant located within an ion guide or ion trap to form reagent and/or dopant ions and/or an excited species and/or a radical species; and causing the reagent and/or dopant ions and/or the excited species and/or the radical species to interact with analyte ions within the ion guide or ion trap in order to cause the analyte ions to fragment and/or dissociate.

The preferred embodiment relates to the provision of a photo-excitation lamp, laser or photon source which is preferably arranged adjacent an RF ion guide or ion trap. However, less preferred embodiments are also contemplated wherein the photo-excitation lamp, laser or photon source may be located at a remote distance from the RF ion guide or ion trap and wherein photons are transmitted from the lamp or source to the RF ion guide or ion trap by e.g. an optical guide.

Reagent molecules or reagent gas (e.g. nitrogen) is preferably arranged to be present within the RF ion guide or ion trap. The reagent molecules or reagent gas are preferably caused to be photo-ionised within the RF ion guide or ion trap resulting in the production of reagent ions.

The reagent molecules or reagent gas such as nitrogen preferably causes collisional cooling of ions within the RF ion guide or ion trap.

The generation of reagent ions within the RF ion guide or ion trap allows various ion-ion or ion-molecule reactions to be performed (and/or studied) within the RF ion guide or ion trap. For example, photo-excited reagent gas may be arranged to interact with neutral molecules or analyte ions within the RF ion guide or ion trap.

According to an embodiment various different ion-ion or ion-radical reactions may be performed by changing the composition of the reagent gas within the RF ion guide or ion trap. The reactions may be interrupted by turning the source of excitation radiation OFF.

The preferred embodiment provides a simple, inexpensive and flexible method of performing reactions within an RF ion guide or ion trap.

By way of contrast, conventional methods involve introduction of reagent ions or excited neutrals or radicals from external sources. Such an approach is generally more complex as a second ion source and optic path needs to be designed for introduction of the reagent ions.

The present invention is therefore particularly advantageous compared to conventional arrangements for generating reagent ions and performing ion-ion reactions.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and An Orbitrap® mass analyser comprising an outer barrel-like electrode and a coaxial inner spindle-like electrode, wherein in a first mode of operation ions are transmitted to the C-trap and are then injected into the Orbitrap® mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the Orbitrap® mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii)

300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

BRIEF DESCRIPTION OF THE DRAWINGS

Various embodiments of the present invention will now be described, by way of example only, and with reference to the accompanying drawing in which:

FIG. 1 shows a preferred embodiment of the present invention.

DETAILED DESCRIPTION OF PREFERRED EMBODIMENTS

A preferred embodiment of the present invention will now be described.

FIG. 1 shows a preferred embodiment of the present invention wherein a quadrupole Time of Flight mass spectrometer is provided comprising an atmospheric pressure ion source 1 such as an Electrospray ion source. Ions from the ion source 1 pass through an interface into a first vacuum chamber.

An RF ion guide 2 is preferably provided in the first vacuum chamber and is preferably maintained at a pressure of between $1\times10^{-3}$ and 2 mbar.

An analytical quadrupole mass filter 3 is preferably provided in a second vacuum chamber downstream of the first vacuum chamber and is preferably maintained at a pressure of $<10^{-4}$ mbar.

A first collision gas cell 4 is preferably provided in a third vacuum chamber downstream of the second vacuum chamber and is preferably maintained at a pressure of $5\times10^{-3}$ mbar.

An Ion Mobility Separation ("IMS") drift cell 5 is preferably provided in a fourth vacuum chamber downstream of the third vacuum chamber and is preferably maintained at a pressure of around 2 mbar.

A second collision gas cell 6 is preferably provided in a fifth vacuum chamber downstream of the fourth vacuum chamber and is preferably maintained at a pressure of $5\times10^{-3}$ mbar.

Finally, an orthogonal acceleration Time of Flight mass analyser 7 is preferably provided and is preferably maintained at a pressure $<10^{-6}$ mbar.

According to the preferred embodiment ultra-violet electromagnetic radiation or UV photons from a VUV lamp 8 is preferably introduced directly into one or more RF confined reaction chambers or ion guides located within one or more of the vacuum chambers of the mass spectrometer.

A carrier or buffer gas (e.g. nitrogen) optionally including one or more volatile dopants is preferably provided or introduced into one or more of the RF confined reaction chambers or ion guides. The composition of the carrier or buffer gas and/or the one or more dopants present within the one or more reaction chambers or ion guides may be changed allowing several different types of reactions to be performed.

In the particular embodiment shown in FIG. 1 four separate vacuum ultra-violet ("VUV") lamps 8 are shown. However, it should be understood that the embodiment shown in FIG. 1 is for illustrative purposes only and other embodiments are contemplated wherein one, two or three VUV lamps 8 may be provided. Similarly, other embodiments are also contemplated wherein more than four VUV lamps 8 may be provided.

According to the particular embodiment shown in FIG. 1 a first VUV lamp 8 is positioned adjacent the RF ion guide 2 located in the first vacuum chamber. A second VUV lamp 8 is positioned adjacent the first collision gas cell 4 located in the third vacuum chamber. A third VUV lamp 8 is positioned adjacent the IMS drift cell 5 located in the fourth vacuum chamber. A fourth VUV lamp 8 is positioned adjacent the second collision gas cell 6 located in the fifth vacuum chamber.

According to an embodiment a source of excitation energy (e.g. UV electromagnetic radiation) may be provided at or adjacent any of the RF confined ion guiding or ion trapping regions of the mass spectrometer either separately or simultaneously.

According to an embodiment of the present invention Collision Induced Dissociation ("CID") fragmentation of ions may be performed before or after ions have reacted with photo-excited reagent ions. Combinations of reactions, mass isolation, mobility separations, fragmentation and mass analysis may be performed according to various different embodiments of the present invention.

According to the preferred embodiment reagent may be introduced into the RF ion guide 2 and/or the first collision cell 4 and/or the IMS cell 5 and/or the second collision cell 6 via one or more reagent inlets 9.

The one or more reagent inlets 9 may comprise a combined inlet for introduction of buffer or collision gas and also one or more volatile dopants. Alternatively, buffer gas or collision gas and optionally one or more volatile dopants may be added or introduced through separate inlet lines.

Various commercially available VUV light sources are available and are particularly suitable for use in various embodiments of the present invention. For example, a S2D2 VUV light source L10706 produces VUV light with a spectral distribution of 115-400 nm and is supplied in a vacuum compatible housing allowing it to be positioned in close proximity to an RF ion guide within a mass spectrometer. Alternatively, an E-Lux VUV light source from Optimare may be used. Such a light source produces a high intensity source of VUV radiation and may be interfaced with vacuum compatible transparent windows or lenses.

Various different types of reactions may be performed according to various different embodiments of the present invention.

According to a particularly preferred embodiment neutral products produced during fragmentation of analyte ions may be ionised within a RF ion guide or collision cell by causing the neutral products to react with reagent ions which are generated within the RF ion guide or collision cell by photoionisation. For example, according to an embodiment neutrals formed as a result of accelerating parent analyte ions into a gas filled RF ion guide in order to fragment the parent analyte ions by Collision Induced Dissociation may be subsequently ionised by reagent ions generated by photoionisation within the RF ion guide or collision cell.

In a similar manner, neutrals formed during ETD fragmentation including fragments and reagent gas neutrals may be ionised by reagent ions generated by photoionisation within the RF ion guide or collision cell.

Ionisation of neutral fragments can yield extra structural information about the analyte.

Ionised neutral species are preferably contained within an RF field after ionization and may be transmitted to a downstream mass analyser or subsequent reaction/fragmentation cell.

According to an embodiment photo-ionisation may be achieved within an RF ion guide or reaction cell by using nitrogen as a buffer gas and adding dopants such as toluene or benzene vapor into the gas stream or directly into the RF ion guide or reaction cell. Once a source of VUV radiation is applied, ionisation may preferably occur due to charge transfer from activated reagent species.

Another reaction which may be performed according to an embodiment of the present invention is charge stripping by Proton Transfer Reaction ("PTR") or electron transfer by exciting a suitable reagent ion such as acetone. Various other PTR reagents are also known. The ability to reduce the charge of a species by utilising PTR can greatly simplify mass spectra.

According to another embodiment ETD fragmentation may be achieved by generating ETD reagent ions and/or reactive radical species within the ion guide or reaction cell.

According to another embodiment ECD fragmentation may be achieved by generating a reactive radical species or sufficient photoelectrons to result in electron capture.

According to another embodiment ozonolysis or ozone induced dissociation may be performed within the ion guide or reaction cell by introduction and photo-ionization of oxygen within the ion guide or reaction cell. Ozonolysis of unsaturated bonds prior to CID fragmentation has been shown to assist in structural elucidation of lipids, peptides and carbohydrates.

In conventional arrangements ozone is typically generated by photo-ionisation of oxygen in an ozone generator which is located external to the reaction chamber. Reference is made to M. C. Thomas, T. W. Mitchell, S. J. Blanksby, "Ozonolysis of phospholipid double bonds during electrospray ionization: a new tool for structure determination" J. Am. Chem. Soc. (2006), 128, 58-59.

According to another embodiment IMS shift reagents or other targeted derivatisation reactions may be assisted by the formation of reactive species in the ion guide or reaction cell. For example, selective adducting of reagents to particular functional groups can assist in elucidation of chemical structure. This may be combined with subsequent fragmentation. Metallisation of species such as polyments or large proteins may be performed by production of suitable reagent ions within the ion guide or collision cell.

Reactions within the ion guide or reaction cell may preferably be rapidly turned ON or OFF by turning the excitation lamp or photo-ionisation source ON or OFF. Other embodiments are also contemplated wherein the electromagnetic radiation source or photo-ionisation source is left ON and a shutter or other device is opened and closed in order to allow photons to be onwardly transmitted into the reaction cell or ion guide. According to these embodiments Data Dependent Acquisition ("DDA") MS-MS experiments may be performed.

$MS^e$ or $HDMS^e$ type experiments may also be performed, wherein alternate spectra with and without VUV excitation are acquired. Analytes present with and without VUV excitation may be linked by LC retention time and or IMS drift time.

For example, an $MS^e$ lipodomics experiment may be performed. A first low energy spectrum may be followed by in situ VUV assisted ozonolysis within the RF gas cell coupled with downstream CID as a second alternating scan. Such an approach can simultaneously provide comprehensive information on the identity and structure of all components in the mixture.

Various further embodiments are contemplated. For example, various different dopants may be used. For example, substituted benxene dopants such as choro and bromo benzene and fluroanisole compounds may be used. Reference is made to D. Robb, D. R. Smith, M. W. Blades, "Investigation of substituted-benzene dopants for charge exchange ionization of nonpolar compounds by atmospheric pressure photoionization" J. Am. Soc. Mass Spectrom. (2008), 19, 955-963 which gives a study of dopants which may be utilised for APPI.

The source of photons may be in vacuum or in atmosphere using a suitable transparent window as a vacuum seal and entrance point for the excitation radiation.

Photo-excitation may be performed in any region of a mass spectrometer or within multiple regions where an RF ion guide or ion trap is used including within an IMS device during IMS separation or within an analytical quadrupole or ion trap. Combinations of different reactions in different regions of the mass spectrometer allow many combinations of experiments to be performed.

Excitation of reagent ions within the RF device may be achieved using different types of radiation. For example, chemical ionisation of neutral molecules may be achieved using a source of electrons directed into the RF ion guide or trap and a suitable reagent (e.g. ammonia). IR photon radiation may be used to extend the range of reagent ions which may be excited.

Interaction cross sections and hence rates of reactions may be controlled and reactions may effectively be stopped by varying the residence time of ions in the device. This can be achieved by application of a DC or transient DC (i.e. travelling wave) driving force to the ion guide or collision cell.

Although the present invention has been described with reference to preferred embodiments, it will be understood by those skilled in the art that various changes in form and detail may be made without departing from the scope of the invention as set forth in the accompanying claims.

The invention claimed is:

1. A mass spectrometer comprising:

an RF ion guide or ion trap;

a device arranged and adapted to supply a reagent gas within said RF ion guide or ion trap;

a photo-ionisation device; and a control system arranged and adapted:

(i) to cause first ions to fragment or dissociate within said RF ion guide or ion trap to form second ions and neutral molecules; and (ii) to cause said photo-ionisation device to photo-ionise or photo-excite said reagent gas to form reagent ions, excited species or radical species, wherein said reagent ions, excited species or radical species interact with at least some of said neutral molecules located within said RF ion guide or ion trap to form analyte ions.

2. A mass spectrometer as claimed in claim 1, wherein said excited species comprise excited neutral atoms, excited neutral molecules, excited metastable atoms or excited metastable molecules.

3. A mass spectrometer as claimed in claim 1, wherein said reagent ions, excited species or radical species interact with at least some of said neutral molecules such that either: (i) energy, protons or electrons are transferred or exchanged between said reagent ions, excited species or radical species and said neutral molecules so as to form said analyte ions; or (ii) energy, protons or electrons are captured by or released from said reagent ions, excited species or radical species or said neutral molecules so as to form said analyte ions.

4. A mass spectrometer as claimed in claim 1, wherein said RF ion guide or ion trap comprises a plurality of electrodes and wherein said mass spectrometer further comprises an AC or RF voltage device arranged and adapted to apply an AC or RF voltage to said plurality of electrodes in order to generate a pseudo-potential which acts to confine ions radially or axially within said RF ion guide or ion trap.

5. A mass spectrometer as claimed in claim 1, wherein said photo-ionisation device comprises an electromagnetic radiation source arranged and adapted to emit photons, wherein said photons are caused to interact, in use, with said reagent gas within said RF ion guide or ion trap in order to photo-ionise or photo-excite said reagent gas.

6. A mass spectrometer as claimed in claim 5, wherein said electromagnetic radiation source is arranged adjacent said RF ion guide or ion trap.

7. A mass spectrometer as claimed in claim 5, wherein said electromagnetic radiation source comprises an ultra-violet radiation source.

8. A mass spectrometer as claimed in claim 7, wherein said ultra-violet radiation source is arranged and adapted to emit photons having a wavelength in a range of 10-400 nm.

9. A mass spectrometer as claimed in claim 7, wherein said ultra-violet radiation source is arranged and adapted to emit photons having an energy ≥3 eV.

10. A mass spectrometer as claimed in claim 5, wherein said electromagnetic radiation source comprises an infra-red radiation source.

11. A mass spectrometer as claimed in claim 10, wherein said infra-red radiation source is arranged and adapted to emit photons having a wavelength in a range of 750 nm-1 mm.

12. A mass spectrometer as claimed in claim 10, wherein said infra-red radiation source is arranged and adapted to emit photons having an energy ≤1.7 eV.

13. A mass spectrometer as claimed in claim 5, wherein said electromagnetic radiation source comprises a lamp.

14. A mass spectrometer as claimed in claim 5, wherein said electromagnetic radiation source comprises an incoherent source of radiation.

15. A mass spectrometer as claimed in claim 1, wherein said reagent gas comprises nitrogen gas.

16. A mass spectrometer as claimed in claim 1, wherein said reagent gas causes collisional cooling of ions within said RF ion guide or ion trap.

17. A mass spectrometer as claimed in claim 1, wherein said control system is further arranged and adapted to control a residence time of said reagent ions, excited species or radical species or analyte ions or first ions or second ions within said RF ion guide or ion trap.

18. A mass spectrometer as claimed in claim 1, wherein said RF ion guide or ion trap is maintained at sub-atmospheric pressure.

19. A mass spectrometer as claimed in claim 18, wherein said RF ion guide or ion trap is maintained in use at a pressure selected from the group consisting of: (i)<$1.0\times10^{-7}$ mbar; (ii) $1.0\times10^{-7}$-$1.0\times10^{-6}$ mbar; (iii) $1.0\times10^{-6}$-$1.0\times10^{-5}$ mbar; (iv) $1.0\times10^{-5}$-$1.0\times10^{-4}$ mbar; (v) $1.0\times10^{-}$-$1.0\times10^{-3}$ mbar; (vi) 0.001-0.01 mbar; (vii) 0.01-0.1 mbar; (viii) 0.1-1 mbar; (ix) 1-10 mbar; (x) 10-100 mbar; and (xi) 100-800 mbar.

20. A mass spectrometer as claimed in claim 1, wherein said RF ion guide or ion trap is located within a vacuum chamber of said mass spectrometer.

21. A mass spectrometer as claimed in claim 1, wherein said RF ion guide or ion trap comprises: (i) an ion tunnel or ion funnel ion guide comprising a plurality of electrodes each having one or more apertures through which ions are transmitted in use; (ii) a plurality of planar electrodes defining an ion guiding region through which ions are transmitted in use; (iii) a multipole rod set ion guide; (iv) an axially segmented multipole rod set ion guide; or (v) a plurality of planar electrodes arranged generally in the plane of ion travel.

22. A mass spectrometer as claimed in claim 1, further comprising a device for applying one or more transient DC potentials or other potentials to electrodes forming said RF ion guide or ion trap in order to control a residence time of said first ions or said second ions or said reagent ions or said analyte ions within said RF ion guide or ion trap.

23. A mass spectrometer as claimed in claim 1, further comprising an ion source and wherein said RF ion guide or ion trap is arranged downstream of said ion source in a vacuum chamber of said mass spectrometer.

24. A mass spectrometer as claimed in claim 23, wherein said ion source is selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source.

25. A mass spectrometer as claimed in claim 23, wherein said vacuum chamber is maintained in use at a pressure selected from the group consisting of: (i)<$1.0\times10^{-7}$ mbar; (ii) $1.0\times10^{-7}$-$1.0\times10^{-6}$ mbar; (iii) $1.0\times10^{-6}$-$1.0\times10^{-5}$ mbar; (iv) $1.0\times10^{-5}$-$1.0\times10^{-4}$ mbar; (v) $1.0\times10^{-4}$-$1.0\times10^{-3}$ mbar; (vi) 0.001-0.01 mbar; (vii) 0.01-0.1 mbar; (viii) 0.1-1 mbar; (ix) 1-10 mbar; (x) 10-100 mbar; and (xi) 100-800 mbar.

26. A mass spectrometer comprising:

an RF ion guide or ion trap;

a device arranged and adapted to supply a reagent gas within said RF ion guide or ion trap;

a photo-ionisation device; and a control system arranged and adapted to cause said photo-ionisation device to photo-ionise or photo-excite said reagent gas to form reagent ions, excited species or radical species, wherein said reagent ions, excited species or radical species interact with analyte ions within said RF ion guide or ion trap in order either: (i) to cause said analyte ions to fragment or dissociate; or (ii) to reduce or change a charge state of said analyte ions.

27. A mass spectrometer as claimed in claim 26, wherein said excited species comprise excited neutral atoms, excited neutral molecules, excited metastable atoms or excited metastable molecules.

28. A mass spectrometer as claimed in claim 26, wherein said reagent ions, excited species or radical species interact with said analyte ions such that either: (i) energy, protons or electrons are transferred or exchanged between said reagent ions, excited species or radical species and said analyte ions; or (ii) energy, protons or electrons are captured by or released from said reagent ions, excited species or radical species or said analyte ions.

29. A mass spectrometer as claimed in claim 26, wherein said analyte ions are caused to fragment by Electron Transfer Dissociation ("ETD").

30. A mass spectrometer as claimed in claim 26, wherein said reagent gas comprises oxygen and wherein said reagent ions comprise ozone which interacts with analyte ions to cause ozone induced dissociation or ozonolysis of said analyte ions.

31. A mass spectrometer as claimed in claim 26, wherein said analyte ions are reduced in charge state by Proton Transfer Reaction ("PTR").

32. A method of mass spectrometry conducted with an RF ion guide or ion trap, said method comprising:

supplying a reagent gas within said RF ion guide or ion trap;

causing first ions to fragment or dissociate within said RF ion guide or ion trap to form second ions and neutral molecules; and photo-ionising or photo-exciting said reagent gas to form reagent ions, excited species or radical species, wherein said reagent ions, excited species or radical species interact with at least some of said neutral molecules located within said RF ion guide or ion trap to form analyte ions.

33. A method of mass spectrometry conducted with an RF ion guide or ion trap, said method comprising:

supplying a reagent gas within said RF ion guide or ion trap; and photo-ionising or photo-exciting said reagent gas to form reagent ions, excited species or radical species, wherein said reagent ions, excited species or radical species interact with analyte ions within said RF ion guide or ion trap in order either: (i) to cause said analyte ions to fragment or dissociate; or (ii) to reduce or change a charge state of said analyte ions.

* * * * *